United States Patent Office 3,392,203
Patented July 9, 1968

3,392,203
OLIGOMERIZATION PROCESS AND CATALYSTS FOR USE IN SAME
Jerome R. Olechowski, Lake Charles, and Arthur A. Arseneaux, New Orleans, La., assignors to Columbian Carbon Company, New York, N.Y., a corporation of Delaware
No Drawing. Filed Aug. 16, 1966, Ser. No. 572,678
24 Claims. (Cl. 260—666)

This invention relates to a process for producing oligomers of conjugated diolefins and to novel catalyst compositions for use in conducting said oligomerization process. More particularly, in one respect, the invention provides a process and catalyst composition for homo-oligomerizing 1,3-butadiene or like conjugated diolefins to dimer and/or trimer oligomers thereof. In another respect, the invention is concerned with the interaction of 1,3-butadiene with a co-monomer, e.g. ethylene, to produce useful cooligomer products.

It is known to oligomerize butadiene or like conjugated diolefins by contacting the diolefin or a mixture of diolefin and co-monomer, e.g. ethylene, in the liquid phase with a molecular organic Lewis base complex of nickel (0), such as one having the structural formula $(L)_nNi(CO)_{4-n}$ wherein L is a molecular Lewis base, preferably an ester of a trivalent Group V–A element having an atomic weight of from about 30 to about 209, and $n$ is an integer from 0 to 4 inclusive. Catalyst compositions of this type have heretofore been prepared, for example, by contacting a nickel carbonyl with an organic molecular Lewis base, optionally in the presence of an activator compound, such as triethylaluminum. While such catalyst compositions are effective in the homo-oligomerization of butadiene or the cooligomerization of butadiene and ethylene, they sometimes give rise to the formation of significant amounts of undesirable low molecular weight solid polymeric by-product in addition to the desired oligomer products. It would, therefore, be desirable to provide catalysts which enable the oligomerization of conjugated diolefin-containing monomer feeds to proceed to the formation of the desired oligomer products in high selectivities, while decreasing the selectivity of undesirable low molecular weight polymeric solids in the product mix. Furthermore, it would be desirable to provide a catalyst whereby the rate of the oligomerization reaction carried out in its presence is increased compared to the aforementioned catalyst compositions prepared according to techniques of the prior art.

Accordingly, it is one object of the present invention to provide an improved oligomerization catalyst.

It is another object of the invention to provide an improved process for oligomerizing conjugated diolefin-containing monomer feeds, whereby the oligomerization reaction proceeds at a relatively rapid rate to the formation of a product mix characterized by relatively high selectivities of the desired oligomer product(s) and relatively low selectivities of undesired low molecular weight polymeric solids.

It is another object of the invention to provide an improved process for oligomerizing two (2) moles of butadiene and one (1) mole of co-monomer, e.g. ethylene.

It is a further object of the invention to provide an improved process for producing cyclic triolefins containing twelve (12) carbon atoms in the cyclic ring in high yield.

Various other objects and advantages of the invention will become apparent to those skilled in the art from the following detailed description thereof.

In accordance with the present invention, highly effective oligomerization catalysts are provided which comprise the interaction product of a nickel compound having a formal valence of +2 or +3, an acylamido compound and a reducing agent capable of reducing the valence of nickel to less than 2, preferably to 0. More particularly, we have now surprisingly found that a catalyst composition prepared as just-described enables the homo-oligomerization of conjugated diolefins or co-oligomerization of conjugated diolefins with a co-monomer to proceed at a decidedly more rapid rate compared to the use of a catalyst prepared by contacting nickel carbonyl with an organic molecular Lewis base. We have also found that the homo-oligomerization of 1,3-butadiene according to our present invention results in exceptionally high selectivities of cyclododecatriene ($C_{12}$) products, e.g. 1,5,9-cyclododecatriene, and that the co-oligomerization of butadiene and ethylene results in exceptionally high selectivities of $C_{10}$ oligomers, e.g. 1,5-cyclodecadiene and 1,4,9-decatriene. Furthermore, the selectivity of undesired low molecular weight polymeric by-product in the converted product mix is relatively low.

Butadiene is the preferred conjugated aliphatic diolefin employed as the starting material of the oligomerization process of this invention. However, other 1,3-dienes are also useful, particularly 2-methyl-1,3-butadiene (isoprene); 2-chloro-1,3-butadiene (chloroprene); 2,3-dichloro-1,3-butadiene; 1,3-pentadiene (piperylene); 2,3-dimethyl-1,3-butadiene; and phenyldiolefins. Partially substituted halogen derivatives may be used, including mixed halogen derivatives, such as chlorofluoro-1,3-butadienes. Other open chain conjugated dienes such as 2,4-hexadiene are also somewhat useful. If desired, peroxides may be removed from the diene feed by treatment with ferrous salts, thiosulfates, or sulfites, according to available methods.

As previously noted, the conjugated diolefins may be rapidly oligomerized in accordance with this invention to produce predominately cyclic oligomers, particularly those having twelve (12) carbon atoms in the carbocyclic ring, such as 1,5,9-cyclododecatriene. The present process is also useful in the co-oligomerization of conjugated dienes with a co-monomer selected from the group consisting of hydrocarbons having the formula:

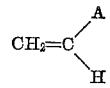

wherein A is selected from the group consisting of phenyl and hydrogen radicals, acetylenic hydrocarbons, vinyl halides and α,β-unsaturated carbonyl and nitriles. Exemplary of specific co-monomers are ethylene, styrene, divinylbenzene, vinyl chloride, acetylene, propyne, acrolein, crotonaldehyde, methylacrylate, methylmethacrylate and acrylonitrile. The preferred co-monomers are ethylene and styrene. Thus, the co-oligomerization of two (2) moles of butadiene and one (1) mole of ethylene may be effected in accordance with the present process to produce cyclic diolefins containing ten (10) ring carbon atoms, such as 1,5-cyclodecadiene, in high yields, as well as normal decatrienes. Likewise, 1,3-butadiene (2 moles) and styrene (1 mole) may be co-oligomerized to 1-phenyl derivatives of cyclic and normal unsaturated hydrocarbons, such as 1-phenyl-1,4,9-decatriene and 1-phenyl-3,7-cyclodecadiene.

As noted above, the catalyst compositions contemplated by the present invention are prepared under substantially anhydrous conditions by reducing the valence of nickel to below 2, preferably to 0, by means of a suitable reducing agent in the presence of an acylamido compound. In general, any nickel compound having a formal valence of +2 or +3 is useful in preparing the catalyst composition. Examples of such suitable nickel sources include inorganic nickel compounds, such as nickel bromide, nickel carbonate, nickel chloride, nickel chlorate, nickel cyanide, nickel ferrocyanide, nickel fluoride, nickel hydroxide, nickel iodide, nickel nitrate, nickel oxide, nickel orthophosphate and nickel sulfate; organic nickel compounds, such as nickel acetate, nickel benzene sulfonate, nickel benzoate, nickel citrate, nickel 2-ethylhexonate, nickel naphthenate, nickel oxalate, nickel stearate, nickel acetylacetonate, nickel benzoylacetonate and nickel dimethylglyoxime; complexes of inorganic nickel salts, such as tris(N-methylpyrrolidone) nickel II bromide. From a practical viewpoint, it is often desirable to prepare the catalyst utilized in the practice of this invention in a hydrocarbon solvent. Accordingly, nickel compounds which have a significant solubility in such hydrocarbons represent a preferred group. Illustrative of this preferred group are the nickel salts of carboxylic acids containing at least six (6) carbon atoms, halogen acids and nickel compounds of organic chelating groups such as acetylacetone, benzoylacetone, dimethylglyoxime, glycine, 8-hydroxyquinoline, nitrosophenylhydroxylamine and salicylaldehyde.

Any reducing agent which is capable under substantially anhydrous conditions of lowering the valence of nickel in a normal oxidation state of two or three to a value of less than two, and preferably to zero, is suitable for use in the present invention. Illustrative of such reducing agents are hydrogen, the hydrazines, and metals of Groups I–A, II–A, II–B, III–A and IV–A, as well as hydride and organometallic compounds of these metals and of boron. Specific examples of suitable reducing agents include hydrazine, methyl hydrazine, unsymmetrical dimethyl hydrazine, lithium, sodium, potassium, beryllium, magnesium, calcium, strontium, barium, zinc, cadmium, mercury, aluminum, gallium, indium, germanium, tin, lead, n-butyl lithium, phenyl sodium, allyl sodium, sodium hydride, diethyl magnesium, phenyl magnesium bromide, calcium hydride, diethyl zinc, mercuric hydride, aluminum hydride, trimethylaluminum, tricyclohexylaluminum, diethylaluminum chloride, ethylaluminum dichloride, ethoxydiethylaluminum, diisobutylaluminum hydride, tetraethyl lead, diborane, dimethyl borane, tetraborane, lithium aluminum hydride, and sodium aluminum tetraethyl. The use of the hydride and organometallic compounds of the aforementioned non-transition metals, which represent a preferred group of reducing agents, results in a particularly active and selective catalyst composition for use in the practice of the invention and facilitates the isolation of the desired homo-oligomers or co-oligomers from the reaction mixture. An especially preferred group of reducing agents can be represented by the formula: $R_aAlX_b$ wherein R is a hydride or hydrocarbyl radical, X is a halide or hydrocarboxy radical, $a$ is from 1 to 3, $b$ is from 0 to 2 and the sum of $a$ plus $b$ is 3. Illustrative of such compounds are trimethylaluminum, triethylaluminum, tri-i-butylaluminum, trioctylaluminum, tridodecylaluminum, tricyclohexylaluminum, triphenylaluminum, tritolylaluminum, ethoxydiethylaluminum, diethoxyethylaluminum, butylaluminum dihydride, diethylphenylaluminum, aluminum trihydride, diethylaluminum chloride, monoethylaluminum dichloride and ethylaluminum sesquihalide, i.e. a mixture of diethylaluminum chloride and ethylaluminum dichloride or a mixture of triethylaluminum and aluminum trichloride. Particularly preferred aluminum compounds for the purposes of this invention are the trialkylaluminum compounds.

The acylamido compounds which are preferred in preparing the present oligomerization catalysts are those corresponding to the formula:

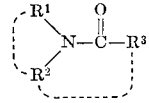

wherein $R^1$ alone is selected from the group consisting of hydrogen, hydrocarbyl and substituted-hydrocarbyl radicals, $R^2$ alone is selected from the group consisting of $R^1$, hydroxy, hydrocarboxy, and amino radicals, and

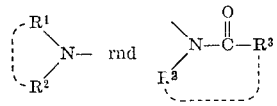

each represent a heterocyclic radical having 5–6 inclusive ring members. It will, of course, be understood that the broken lines in the above formula between $R^1$ and $R^2$ as well as between $R^2$ and $R^3$ indicate that such chemical bonds are optional. Suitable acylamido compounds include amides, such as acetamide, benzamide, succinamide, N-methylacetamide, N,N-diethylacetamide, and N,N-dimethylformamide; imides, such as phthalimide, succinimide, N-nitrososuccinimide, N-phenylsuccinimide, N-phenylmaleimide, N-methylsuccinimide, N-methylphthalimide, N - acetyltetrahydrophthalimide, N-benzoylsuccinimide, and N-benzoylphthalimide; ureas, such as urea, N,N'-diethylurea and N,N'-dimethylurea; carbamates, such as ethylcarbamate and isopropylcarbamate; and lactams, such as caprolactam, pyrrolidone (γ-butyrolactam), piperidone (δ-valerolactam), N-nitroso-2-pyrrolidone, N-methyl-2-pyrrolidone, N-vinyl-2-pyrrolidone, N-acetyl-2-pyrrolidone, N-acetyl-ε-caprolactam, N-benzoyl-ε-caprolactam, N-benzoyl-δ-valerolactam, N-ethylcarbamyl-ε-caprolactam, N-propionyl-ω-caprolactam, N - tolyl - ω-decanolactam, 5-methyl-N-methyl-2-pyrrolidone, 4-methyl-N-methyl-2-pyrrolidone, 4-ethyl-N-vinyl-2-pyrrolidone, and N-methyl-2-piperidone. N-methyl-2-pyrrolidone is particularly suitable.

In preparing the catalyst compositions, the reducing agent may be employed in an amount such that the molar ratio of reducing agent to nickel (positive valence) compound is from about 0.1:1 to about 50:1, although it is seldom necessary or desirable to operate outside of the preferred range of from about 0.25:1 to about 25:1, and particularly from about 1:1 to about 12:1. The acylamido compound is preferably employed in an amount of from about 0.5 to about 6.0 moles, particularly from about 2.5 to about 3.5 moles, per mole of nickel compound.

In effecting the oligomerization reaction contemplated by the invention, the nickel compound, acylamido compound and reducing agent may be admixed in an inert organic solvent and then contacted under substantially anhydrous conditions with the conjugated diolefin-containing monomer feed. Alternatively, the nickel compound acylamido compound and reducing agent may be admixed in the inert solvent in the presence of the conjugated diolefin-containing monomer feed. The solvent used in preparing the catalyst and conducting the oligomerization reaction may be any inert organic solvent, such as benzene, toluene, petroleum naphtha, hexane, heptane, isooctane, cyclohexane, etc. The temperature at which the reaction is conducted may vary over a wide range, such as from about 0° C. to about 180° C., although the range of 20° C. to 150° C., particularly 30° C. to 100° C., is generally most preferred. In general, reactions conducted at temperatures below about 20° to 30° C. are quite slow, while operating temperatures above about 100°–150° C. may result in diminished yields of the desired oligomer product. Furthermore, in co-oligomerization of butadiene with ethylene higher reaction temperatures tend to favor the formation of linear decatriene product. What it is desired to produce predominately 1,5-cyclodecadiene, temperatures below 80° C. are preferred. Optimum pressure is dependent on the particular monomer(s) oligomerized. Thus, in the oligomerization of 1,3-butadiene, the reaction pressure may range from about 10 to about 500 p.s.i.g., or higher. On the other hand, the co-oligomerization of butadiene and ethylene may be advantageously conducted using pressures up to about 3000 p.s.i.g., or higher. The concentration of catalyst in the reaction mixture may advantageously range from about 0.01 to about 10% by weight of the monomer(s), although concentrations within the range of 0.1% to about 2.0% are usually most preferred.

If desired, polymerization inhibitors may also be included in the reaction mixture, for instance in an amount of from about 0.001% to about 4.0% based on the weight of the monomer feed. Suitable polymerization inhibitors are well-known to the art and include phenol, catechol, p-tert-butyl catechol, resorcinol and hydroquinone.

Following completion of the reaction, conventional techniques may be employed to deactivate the catalyst composition and recover the desired oligomer products. One suitable catalyst deactivation procedure involves contacting the reaction mixture with aqueous methanol.

In producing co-oligomers of butadiene and ethylene or butadiene and styrene, for instance 1,5-cyclodecadiene or 1-phenyl-3,7-cyclodecadiene, butadiene and the co-monomer may be employed in molar ratios of about 1:1 to about 3:1 as the feed. However, butadiene:co-monomer mole ratios of from about 0.05 to about 20:1 may also be used. It should be noted, however, that lower butadiene:co-monomer mole ratios within the specified ranges tend to favor the formation of linear oligomer.

The invention will now be further described in reference to the following specific examples, which are presented solely for the purpose of illustration and are not to be interpreted as limiting the scope of the invention.

Examples 1–2

In each of Examples 1–2, a clean, dry, 300 ml. stainless steel autoclave equipped with a magnetic stirrer was flushed with argon, evacuated and then charged with 25 ml. of benzene, 3.9 millimoles of nickel acetylacetonate, 100 grams of butadiene and 9.75 millimoles of triethylaluminum. In Example 2, which represents the run in accordance with the present invention, 11.70 millimoles of N-methyl-2-pyrrolidone were also added prior to the addition of triethylaluminum. The molar ratio of triethylaluminum:nickel acetylacetonate was, therefore, 2.5:1 in both runs, while the mole ratio of N-methyl-2-pyrrolidone:nickel acetylacetonate was 3:1 in Example 2.

In each case, the contents of the autoclave were then stirred and the temperature was raised to about 80° C. and maintained at that level for about four (4) hours. The catalyst was then "killed" by the addition of 5.0 ml. of a 50% aqueous solution of methanol, and the recovered reaction product was analyzed by vapor phase chromatography with the following results:

TABLE 1

| Product | Selectivity (wt. percent) | |
|---|---|---|
| | Example 1 | Example 2 |
| Vinylcyclohexene | 5.9 | 4.6 |
| Cyclooctadiene | 8.7 | 4.2 |
| Cyclodecatriene | 73.3 | 87.7 |
| Non-volatiles | 12.1 | 3.4 |

It will be observed from the above data that the catalyst prepared by reducing the valence of nickel in the presence of an acylamido compound, i.e., N-methyl-2-pyrrolidone (Example 2), is highly effective in the conversion of 1,3-butadiene to 1,5,9-cyclododecatriene. It will be particularly noted that the catalyst of the invention resulted in diminished yields of undesirable low molecular weight polymeric by-products compared to the catalyst prepared in the absence of N-methyl-2-pyrrolidone.

Examples 3–5

These examples illustrate the conversion of 1,3-butadiene to cyclododecatriene under varying reaction conditions utilizing a catalyst prepared by reducing nickel acetylacetonate with triethylaluminum in the presence of N-methyl-2-pyrrolidone and 1,3-butadiene monomer. In each case the molar ratio of triethylaluminum:N-methyl-2-pyrrolidone:nickel acetylacetonate was 5:3:1, and the catalyst concentration was about 0.5 percent by weight of butadiene. A benzene solvent was used. The reaction conditions and selectivities of the resultant products of the oligomerization were as follows. In the table, the abbreviations "VCH," "COD," "CDT" and "NV" stand, respectively for vinylcyclohexene, cyclooctadiene, 1,5,9-cyclododecatriene and non-volatile low molecular weight polymers.

TABLE 2

| | Reaction Time (hrs.) | Reaction Temp. (° C.) | Conversion (percent) | Selectivity | | | |
|---|---|---|---|---|---|---|---|
| | | | | VCH | COD | CDT | NV |
| Example: | | | | | | | |
| 3 | 0.75 | 120 | 94 | 7.8 | 7.6 | 77.8 | 6.8 |
| 4 | 1.0 | 100 | 98 | 6.7 | 8.7 | 81.3 | 3.3 |
| 5 | 3.0 | 80 | 84 | 3.4 | 6.5 | 86.7 | 3.4 |

It will be seen that all runs resulted in excellent butadiene conversions and 1,5,9-cyclododecatriene selectivities, and low yields of undesirable solid polymeric by-product. Lower oligomerization reaction temperatures tended to increase selectivity of 1,5,9-cyclododecatriene.

Examples 6–7

These examples illustrate the oligomerization of 1,3-butadiene in the presence of catalysts prepared in situ by the reduction of $NiCl_2$ by triisobutylaluminum in the presence and absence of N-methyl-2-pyrrolidone. The reaction conditions and results were as set forth in Table 3 below:

TABLE 3

| | Example | |
|---|---|---|
| | 6 | 7 |
| Autoclave Charge: | | |
| 1,3-butadiene (grams) | 94 | 94 |
| Benzene solvent (grams) | 44 | 44 |
| Nickel chloride (m. moles) | 3.8 | 3.8 |
| N-methyl-2-pyrrolidone (m. moles) | 11.0 | |
| Tri-isobutylaluminum (m. moles) | 20 | 20 |
| Reaction Conditions: | | |
| Time (hrs.) | 3 | 2½ |
| Temp. (° C.) | 80 | 80–100 |
| Pressure (p.s.i.g.) | 105–165 | |
| Conversion (% wt.) | 84 | 77 |
| Product Selectivity (% wt.): | | |
| Vinylcyclohexene | 3.4 | |
| Cyclooctadiene | 6.5 | |
| 1,5,9-cyclododecatriene | 81.4 | |
| Non-volatiles | 3.4 | (1) |
| Unknowns | 2.1 | |

¹ Essentially 100%.

As will be readily seen from the above data, the catalyst prepared using N-methyl-2-pyrrolidone (Example 6) enabled high cyclododecatriene selectivity while decreasing selectivity of non-volatiles. On the other hand, the catalyst prepared by reducing nickel chloride in the absence of N-methyl-2-pyrrolidone resulted in essentially 100% polymer.

Examples 8–13

These examples illustrate the use of various acylamido compounds in preparing oligomerization catalyst compositions by interacting nickel chloride with triethylaluminum, in accordance with the invention. For the purposes of control, a catalyst composition was prepared by reducing $NiCl_2$ in the absence of acylamido compound, but in the presence of butadiene monomer (Example 8). In Examples 9–13, however, the below-specified acylamido compound was present in the reaction mixture during reduction of $NiCl_2$.

TABLE 4

| | Example | | | | | |
|---|---|---|---|---|---|---|
| | 8 | 9 | 10 | 11 | 12 | 13 |
| Autoclave Charge: | | | | | | |
| Benzene Solvent (ml.) | 35 | 35 | 35 | 35 | 35 | 35 |
| 1,3-butadiene (gms.) | 60 | 60 | 60 | 60 | 60 | 60 |
| Nickel Chloride (mmoles) | 3.9 | 3.9 | 3.9 | 3.9 | 3.9 | 3.9 |
| N-methyl-2-pyrrolidone (mmoles) | | | 11.7 | | | |
| N-methyl-2-piperidone (mmoles) | | | | 11.7 | | |
| 5-methyl-N-methyl-2-pyrrolidone (mmoles) | | | | | 9.5 | |
| N-benzoyl-ε-caprolactam (mmoles) | | | | | | 11.7 |
| N,N-dimethylformamide (mmoles) | | | | | | 15.6 |
| Triethylaluminum (mmoles) | 15.6 | 15.6 | 15.6 | 15.6 | 15.6 | 15.6 |
| Oligomerization Conditions: | | | | | | |
| Temp. (° C.) | 80 | 80 | 80 | 80 | 80 | 80 |
| Time (hrs.) | 3 | 4 | 2 | 3 | 3 | 3 |
| Total Pressure (p.s.i.g.) | 160 | 160 | 160 | 160 | 160 | 160 |
| Butadiene Conversion (wt. percent) | 82 | 91 | 86 | 90 | 95 | 89 |
| Product Selectivities (wt. percent): | | | | | | |
| Vinylcyclohexene | | 4.3 | 8.6 | 6.1 | 4.8 | 6.4 |
| Cyclooctadiene | | 7.1 | 4.7 | 7.1 | 8.0 | 5.3 |
| 1,5,9-cyclododecatriene | | 86.0 | 83.7 | 81.2 | 81.5 | 83.0 |
| Non-volatiles | (¹) | 2.3 | 2.8 | 4.9 | 5.7 | 5.1 |

¹ Essentially 100%.

It will be noted that the oligomerization reactions carried out in the presence of the catalyst compositions prepared in accordance with the invention resulted in increased butadiene conversion and 1,5,9-cyclododecatriene selectivity and decreased formation of low molecular weight polymeric solids.

Example 14

A catalyst composition was prepared by mixing in benzene solvent, nickel naphthenate (3.9 mmoles), N-methyl-2-pyrrolidone (11.7 mmoles) and diethylethoxy-aluminum (15.6 mmoles). To the resultant solution was charged one (1) mole of 1,3-butadiene and the temperature was maintained at about 60° C. for five (5) hours. Selectivity of 1,5,9-cyclododecatriene product was about 75%, while selectivity of low molecular weight polymer was only about 5%.

Examples 15–18

These examples illustrate the utility of the present catalyst systems in effecting the co-oligomerization of 2 moles of butadiene and 1 mole of ethylene to form $C_{10}$ oligomers, namely 1,4,9-decatriene and 1,5-cyclodecadiene. The reaction conditions and results were as set forth in Table 5, below:

TABLE 5

| | 15 | 16 | 17 | 18 |
|---|---|---|---|---|
| Autoclave Charge: | | | | |
| Solvent (ml.) | ᵃ50 | ᵃ50 | ᵃ50 | ᵃ50 |
| Nickel compound (mmoles) | ᶜ3.9 | ᶜ3.9 | ᵈ3.9 | ᵉ3.9 |
| Acylamido compound (mmoles) | ᶠ11.7 | ᶠ11.7 | ᶠ11.7 | ᵍ11.7 |
| Butadiene (moles) | 1 | 1 | 1 | 1 |
| Ethylene (moles) | 0.5 | 0.5 | 0.5 | 0.5 |
| Triethylaluminum (mmoles) | 19.5 | 19.5 | 19.5 | 19.5 |
| Reaction Conditions: | | | | |
| Reaction time (hrs.) | 5 | 5 | 4 | 5 |
| Reaction temp. (° C.) | 50 | 70 | 60 | 50 |
| Butadiene Conv. (percent wt.) | 93 | 80 | 70 | 54 |
| Product Selectivity (percent wt.): | | | | |
| Cyclooctadiene-Vinylcyclohexene | 3.4 | 5.1 | 2.6 | 2.1 |
| 1,4,9-decatriene | 42.4 | 43.9 | 47.0 | 23.1 |
| 1,5-cyclodecadiene | 37.1 | 18.7 | 25.4 | 39.2 |
| 1,5,9-cyclododecatriene | 15.1 | 22.0 | 21.3 | 29.5 |
| Non-volatiles | 2.4 | 6.3 | 2.8 | 5.8 |

ᵃ Benzene.
ᵇ Chlorobenzene.
ᶜ Nickel chloride.
ᵈ Nickel acetate.
ᵉ Nickel acetylacetonate.
ᶠ N-methyl-2-pyrrolidone.
ᵍ Dimethylformamide.

It will be noted that using the present catalysts, butadiene and ethylene may be effectively co-oligomerized to principally $C_{10}$ products, with low yields of polymeric by-products.

While the invention has been described above with respect to certain preferred embodiments thereof, it will be understood by those skilled in the art that various changes and modifications may be made without departing from the spirit and scope of the invention, and it is intended to cover all such changes and modifications in the appended claims.

Therefore, we claim:

1. A catalyst composition comprising an interaction product of:
   (a) a nickel compound selected from the group consisting of nickel (II) and nickel (III) compounds;
   (b) a reducing agent capable of reducing the valence of nickel to less than 2; and
   (c) an acylamido compound.

2. Composition as in claim 1 wherein said reducing agent is selected from the group consisting of hydrogen, the hydrazines, metals of Groups I–A, II–A, II–B, III–A and IV–A and hydride and organometallic compounds of said metals and of boron.

3. Composition as in claim 2 wherein said reducing agent is an aluminum compound represented by the formula $R_aAlX_b$ wherein R is a radical selected from the group consisting of hydride and hydrocarbyl radicals, X is a radical selected from the group consisting of halide and hydrocarboxy radicals, $a$ is from 1 to 3, $b$ is from 0 to 2 and the sum of $a$ plus $b$ is 3.

4. Composition as in claim 3 wherein said aluminum compound is a trialkylaluminum compound.

5. Composition as in claim 1 wherein the valence of nickel is reduced to 0 upon being interacted with said reducing agent.

6. Composition as in claim 1 wherein said acylamido compound is represented by the formula:

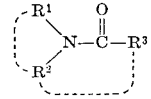

wherein $R^1$ alone is selected from the group consisting of hydrogen, hydrocarbyl and substituted hydrocarbyl radicals, $R^2$ alone is selected from the group consisting of $R^1$, hydroxy, hydrocarboxy, nitroso, amino, carbonyl and

radicals, $R^3$ alone is selected from the group consisting of hydrocarbyl, substituted hydrocarbyl, hydrocarboxy, and amino radicals, and

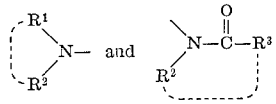

each represent a heterocyclic radical having 5–6 inclusive carbon atoms.

7. Composition as in claim 6 wherein said acylamido compound is a lactam.

8. Composition as in claim 1 wherein the mole ratio of said reducing agent to said nickel compound is from about 0.1:1 to about 50:1 and the mole ratio of said acylamido compound to said nickel compound is from about 0.5:1 to about 6:1.

9. Composition as in claim 8 wherein the mole ratio of said reducing agent to said nickel compound is from about 1:1 to about 12:1 and the mole ratio of said acylamido compound to said nickel compound is from about 2.5:1 to about 3.5:1.

10. Composition as in claim 1 wherein said nickel compound is a nickel (II) compound, said reducing agent is a trialkylaluminum compound and said acylamido compound is a lactam.

11. Composition as in claim 10 wherein said nickel (II) compound is nickel chloride, said trialkylaluminum compound is triethylaluminum and said lactam is N-methyl-2-pyrrolidone.

12. An oligomerization process which comprises contacting under substantially anhydrous conditions a monomeric feed comprising the aliphatic conjugated diolefin, butadiene, with a catalyst composition comprising the interaction product of:
 (a) a nickel compound selected from the group consisting of nickel (II) and nickel (III) compounds;
 (b) a reducing agent capable of reducing the valence of nickel to less than 2; and
 (c) an acylamido compound.

13. Process as in claim 12 wherein said reducing agent is selected from the group consisting of hydrogen, the hydrazines, metals of Groups I–A, II–A, II–B, III–A and IV–A and hydride and organometallic compounds of said metals and of boron.

14. Process as in claim 13 wherein said reducing agent is an aluminum compound represented by the formula $R_aAlX_b$ wherein R is a radical selected from the group consisting of hydride and hydrocarbyl radicals, X is a radical selected from the group consisting of halide and hydrocarboxy radicals, $a$ is from 1 to 3, $b$ is from 0 to 2 and the sum of $a$ plus $b$ is 3.

15. Process as in claim 14 wherein said aluminum compound is a trialkylaluminum.

16. Process as in claim 12 wherein the valence of nickel is reduced to 0 upon being interacted with said reducing agent.

17. Process as in claim 12 wherein said acylamido compound is represented by the formula:

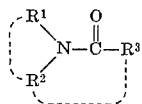

wherein $R^1$ is selected from the group consisting of hydrogen, hydrocarbyl and substituted hydrocarbyl radicals, $R^2$ alone is selected from the group consisting of $R^1$, hydroxy, hydrocarboxy, nitroso, amino, carbonyl and

radicals, $R^3$ alone is selected from the group consisting of hydrocarbyl, substituted hydrocarbyl, hydrocarboxy and amino radicals, and

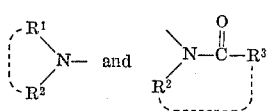

each represent a heterocyclic radical having 5–6 inclusive carbon atoms.

18. Process as in claim 17 wherein said acylamido compound is a lactam.

19. Process as in claim 12 wherein the mole ratio of said reducing agent to said nickel compound is from about 0.1:1 to about 50:1 and the mole ratio of said acylamido compound to said nickel compound is from about 0.5:1 to about 6:1.

20. Process as in claim 19 wherein the mole ratio of said reducing agent to said nickel compound is from about 1:1 to about 12:1 and the mole ratio of said acylamido compound to said nickel compound is from about 2.5:1 to about 3.5:1.

21. Process as in claim 12 wherein said monomeric feed comprises a mixture of said conjugated diolefin butadiene and a co-monomer ethylene.

22. Process as in claim 21 wherein said monomeric feed is an admixture of 1,3-butadiene and ethylene, the mole ratio of said 1,3-butadiene to said ethylene co-monomer being from about 0.5:1 to about 20:1.

23. Process for oligomerizing a monomeric feed comprising 1,3-butadiene which comprises contacting said monomeric feed under substantially anhydrous conditions at a temperature of from about 0° C. to about 180° C. with a catalyst composition comprising the interaction product of a nickel (II) compound, a trialkylaluminum compound and a lactam, the mole ratio of said trialkylaluminum to said nickel (II) compound being from about 0.1:1 to about 50:1 and the mole ratio of said lactam to said nickel (II) compound being from about 0.5:1 to about 6:1.

24. Process as in claim 23 wherein said nickel (II) compound is nickel chloride, said trialkylaluminum is triethylaluminum and said lactam is N-methyl-2-pyrrolidone.

References Cited

UNITED STATES PATENTS

| | | | |
|---|---|---|---|
| 2,809,976 | 10/1957 | Reppe et al. | 260—439 |
| 2,854,458 | 9/1958 | Reppe et al. | 260—439 |
| 2,886,591 | 5/1959 | Lautenschlager | 260—439 |
| 2,969,408 | 1/1961 | Nowlin et al. | 260—666 |
| 3,238,265 | 3/1966 | Mueller | 260—666 |
| 3,247,270 | 4/1966 | Kirk | 260—666 |
| 3,271,468 | 9/1966 | Wilke et al. | 260—666 |
| 3,277,099 | 10/1966 | Seibt | 260—666 |
| 3,296,260 | 1/1967 | Knoth | 260—439 |
| 3,321,546 | 5/1967 | Roest et al. | 260—683.2 |
| 3,326,990 | 6/1967 | Clark | 260—666 |
| 3,352,931 | 11/1967 | Zuech | 260—666 |

FOREIGN PATENTS 1,018,369   1/1966   Great Britain.

DELBERT E. GANTZ, *Primary Examiner.*

V. O'KEEFE, *Assistant Examiner.*